(No Model.)  2 Sheets—Sheet 1.
G. A. NEWMAN.
EXPLOSIVE ENGINE.
No. 602,707. Patented Apr. 19, 1898.
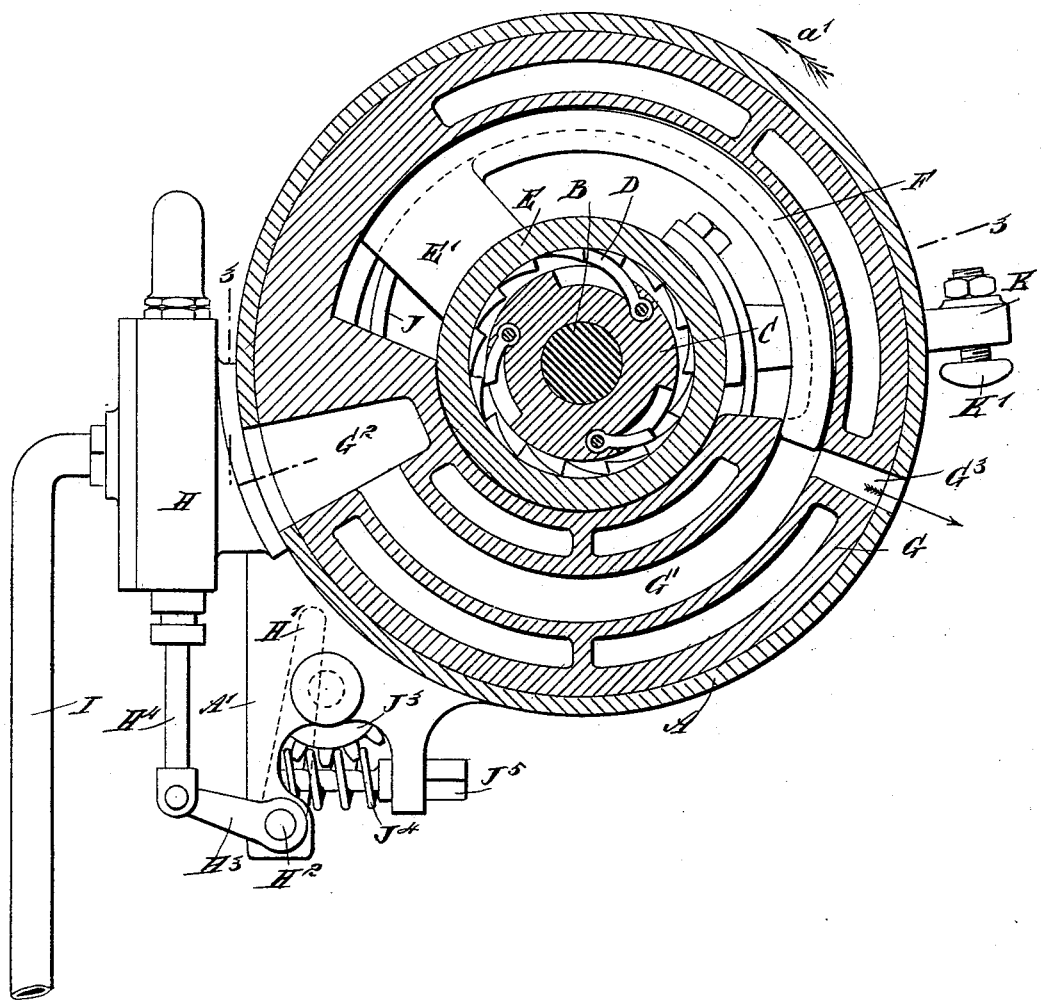
Fig. I
WITNESSES:
H. Walker
Geo. J. Hosted
INVENTOR
G. A. Newman
BY Munn & Co.
ATTORNEYS.

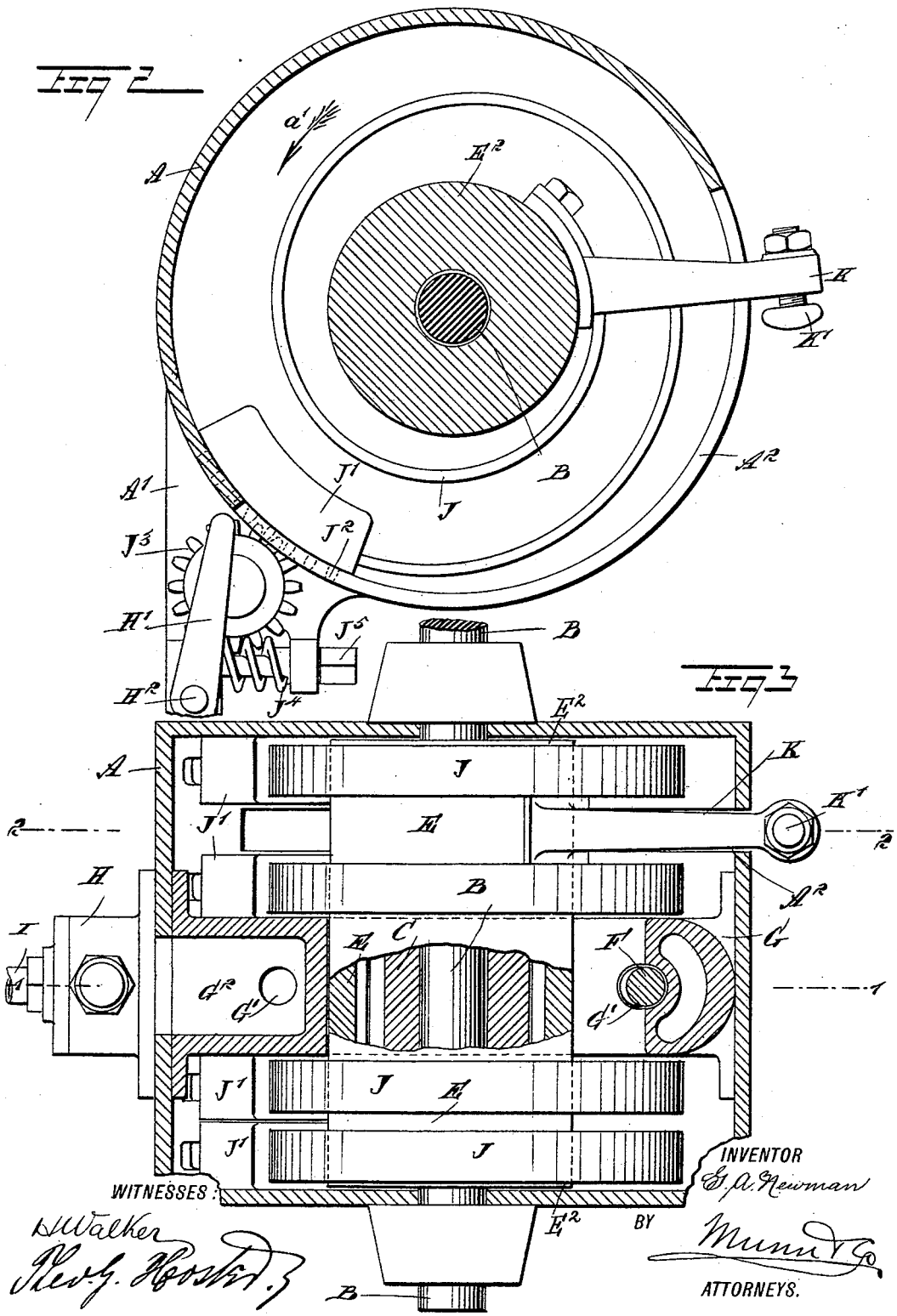

UNITED STATES PATENT OFFICE.

GEORGE A. NEWMAN, OF CLIFF, NEBRASKA.

EXPLOSIVE-ENGINE.

SPECIFICATION forming part of Letters Patent No. 602,707, dated April 19, 1898.

Application filed February 16, 1897. Serial No. 623,689. (No model.)

*To all whom it may concern:*

Be it known that I, GEORGE A. NEWMAN, of Cliff, in the county of Custer and State of Nebraska, have invented certain new and useful Improvements in Explosive-Engines for the Transmission of Power, of which the following is a full, clear, and exact description.

The object of the invention is to provide certain new and useful improvements in the transmission of power whereby the force of the motive agent on the piston of an engine, for instance, is utilized to the fullest advantage to rotate the main driving-shaft.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement on the line 1 1 of Fig. 3. Fig. 2 is a similar view of the same on the line 2 2 of Fig. 3, and Fig. 3 is a sectional plan view of the same on the line 3 3 of Fig. 1.

The improved device is provided with a suitably-constructed casing A, preferably made cylindrical in shape and formed at its ends with bearings for the main driving-shaft B, connected by suitable means with the machinery to be driven. On the shaft B, within the casing A, is keyed or otherwise secured a wheel C, carrying on its periphery a series of pawls D, adapted to engage the internal teeth of a ratchet-wheel E, concentric with the wheel C and shaft B. On the periphery of the wheel E is secured a block E', connected with one end of a segmental piston F, adapted to move in the segmental bore G' of a cylinder G, secured in the casing A. One end of the bore G' opens into an explosion-chamber $G^2$, in which a suitable explosive mixture is ignited, so as to force the piston F outward in the bore G', so as to assume the position shown in Fig. 1, it being understood that at the time of the explosion the free end of the piston F is close to the explosion-chamber $G^2$. When the piston F moves into its outermost position, (shown in Fig. 1,) it uncovers the exhaust-port $G^3$, leading from this end of the bore G' to the outside, so that the burned gases of the explosion can escape from the bore and working chamber.

The explosive mixture is admitted to the chamber $G^2$ by a suitable valve mechanism H, secured to the casing A and connected by a pipe I with a suitable gas-supply. The hub $E^2$ of the ratchet-wheel E is mounted to rotate loosely on the shaft B and extends preferably to opposite sides of the cylinder G, as plainly indicated in the drawings, special reference being had to Fig. 3. On the periphery of the hub $E^2$ are secured the inner ends of one or more spiral springs J, secured at their outer ends to blocks J', fitted to slide on the inside of the casing A, as plainly shown in Figs. 2 and 3. Each of the blocks J' is formed with segmental gear-teeth $J^2$, in mesh with a gear-wheel $J^3$, journaled on a bracket A', forming part of the casing A. One of the gear-wheels $J^3$ is also in mesh with a worm $J^4$, the shaft of which is adapted to be turned by a suitable key or other tool applied to the square end $J^5$ of the shaft for the worm. Thus by turning the latter the several gear-wheels $J^3$ are simultaneously rotated by the shaft to shift the blocks J' in the casing A to increase or diminish the tension of the several springs J. On the hub $E^2$ of the internal ratchet-wheel E is secured an arm K, provided at its free end with an adjustable head K', adapted to engage the free end of an arm H', secured on a shaft $H^2$, journaled in the bracket A', the said shaft $H^2$ being connected by an arm $H^3$ with the valve-stem $H^4$ of the valve mechanism H, previously referred to, it being understood that the said head strikes the arm H' at the time the piston F is in an innermost position—that is, with its free end near the explosion-chamber $G^2$. The arm K passes loosely through a slot $A^2$, formed in the casing A.

The operation is as follows: At the time the piston F is in an innermost position the head K' has moved the arm H', so that the valve mechanism H admits an explosive mixture to the explosion-chamber $G^2$, and this explosive mixture, after the valve has closed, is ignited by a suitable igniting mechanism, (not shown,) so that the force of the explosion sends the piston F into the uppermost position. (Shown in Fig. 1.) The piston in moving into this position causes a turning of the ratchet-wheel E, whereby the several spiral springs J are wound up; but the wheel C and its pawls D are not affected by the turning of the ratchet-wheel, as the pawls D glide over the teeth during the turning of the ratchet-wheel in the direction of the arrow $a'$. As soon as the piston F has reached the end of its outward stroke the burned gases are exhausted by passing to the outer air through the exhaust-port $G^3$. Now the tension or recoil of the wound-up springs J is exerted on the hub $E^2$ of the ratchet-wheel E, so as to turn the same and the piston F in the inverse direction of the arrow $a'$. The return movement of the ratchet-wheel E in the inverse direction of the said arrow also causes a return movement of the piston F to bring the latter back to an innermost position, and the arm K likewise moves with the said ratchet-wheel, so as to actuate the valve mechanism H and admit a charge of explosive matter into the explosion-chamber $G^2$. The above operation is then repeated—that is, the next explosion again sends the piston F outward to wind up the springs, and the recoil of the latter then causes a rotation of the driving-shaft, as above explained.

Having thus fully described my invention, I claim as new and desire to secure by Letters Patent—

1. A device of the class described, comprising a cylinder, a driving-shaft mounted in the cylinder, one or more spiral springs, a connection between the springs and driving-shaft for operating the latter from the former, and a piston in the cylinder and adapted to receive an impulse thereon to wind up the springs, substantially as described.

2. A device of the class described, comprising a pawl-and-ratchet mechanism connected with the main driving-shaft, one or more spiral springs attached by their inner ends to the ratchet-wheel of the said pawl-and-ratchet mechanism, and a piston moving in a cylinder and adapted to receive an impulse thereon, the said piston being secured to and carried by the said ratchet-wheel, substantially as shown and described.

3. A device of the class described, comprising a pawl-and-ratchet mechanism connected with the main driving-shaft, one or more spiral springs attached by their inner ends to the ratchet-wheel of the said pawl-and-ratchet mechanism, a piston moving in a cylinder and adapted to receive an impulse thereon, the said piston being secured to and carried by the said ratchet-wheel, and a valve mechanism controlled by the said ratchet-wheel, as set forth.

4. A device of the class described, comprising a pawl-and-ratchet mechanism connected with the main driving-shaft, one or more spiral springs attached by their inner ends to the ratchet-wheel of the said pawl-and-ratchet mechanism, a piston moving in a cylinder and adapted to receive an impulse thereon, the said piston being connected with the said ratchet-wheel, and means substantially as described, for increasing or diminishing the tension of the said springs, as set forth.

5. A device of the class described, comprising a cylinder, a driving-shaft mounted in the cylinder, one or more spiral springs, a pawl-and-ratchet mechanism between the springs and driving-shaft, and a piston in the cylinder and connected with the pawl-and-ratchet mechanism, said piston being adapted to receive an impulse thereon to move it in one direction to wind up the springs, substantially as described.

6. A device of the class described, comprising a cylinder, a driving-shaft mounted therein, a ratchet-wheel mounted loosely upon the shaft, pawls carried by the shaft and engaging the ratchet-wheels, spiral springs having one end secured to said ratchet-wheel, and a segmental piston secured to the ratchet-wheel and adapted to receive an impulse thereon to turn the said ratchet-wheel and wind the springs, substantially as described.

7. In a device of the class described, the combination of a cylinder having a segmental bore, a driving-shaft in the cylinder, a ratchet-wheel mounted loosely on the shaft, pawls carried by the shaft and engaging the ratchet-wheel, spiral springs having one end secured to the ratchet-wheel and their other ends to a movable support, means for adjusting said support, and a segmental piston in the cylinder and adapted to receive an impulse thereon to turn the ratchet-wheel and wind the springs, substantially as described.

8. In a device of the class described, the combination with a casing, a cylinder in the casing and having a segmental bore, an explosion-chamber and exhaust-port, and a driving-shaft mounted in said casing and cylinder, of a ratchet-wheel loosely mounted on the shaft, pawls carried by the shaft and engaging the ratchet-wheel, spiral springs having one end secured to the hubs of the ratchet-wheel and their other ends to the casing, a segmental piston secured to the ratchet-wheel and working in the bore of the cylinder, a valve mechanism for admitting the explosive mixture to the explosive-chamber of the cylinder, and means for operating the valve mechanism from the ratchet-wheel, substantially as described.

GEORGE A. NEWMAN.

Witnesses:
C. L. GUTTERSON,
N. V. PIERSON.